US012640667B2

(12) United States Patent
Ka et al.

(10) Patent No.: US 12,640,667 B2
(45) Date of Patent: May 26, 2026

(54) MOTOR SAFETY CONTROL METHOD AND ROBOT FOR IMPLEMENTING THE SAME

(71) Applicant: LG ELECTRONICS INC., Seoul (KR)

(72) Inventors: Hokyung Ka, Seoul (KR); Junsin Park, Seoul (KR); Jongkwon Yi, Seoul (KR); Sunuk Kim, Seoul (KR); Jaehyeuck Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 142 days.

(21) Appl. No.: 18/590,657

(22) Filed: Feb. 28, 2024

(65) Prior Publication Data

US 2024/0429840 A1     Dec. 26, 2024

(30) Foreign Application Priority Data

Jun. 22, 2023    (KR) ........................ 10-2023-0080545

(51) Int. Cl.
*H02P 6/16*          (2016.01)
*B60L 15/20*        (2006.01)
(Continued)

(52) U.S. Cl.
CPC ................ *H02P 6/17* (2016.02); *B60L 15/20* (2013.01); *G05D 1/622* (2024.01); *H02K 11/215* (2016.01);
(Continued)

(58) Field of Classification Search
CPC ...... H02K 11/215; H02K 11/22; H02K 21/20; H02P 6/17; H02P 29/024; H02P 6/16;
(Continued)

(56) References Cited

U.S. PATENT DOCUMENTS 5,834,916 A   *   11/1998   Shimogama ......... G05B 19/231
                                                                     901/50
2004/0119427 A1      6/2004   Stridsberg
                              (Continued)

FOREIGN PATENT DOCUMENTS

CN          103697927          4/2014
EP           2308737          4/2011
                  (Continued)

OTHER PUBLICATIONS

IEEE 2022—Position Locking for Permanent Magnet Synchronous Machine Propeller Drives in Drones by Hall-Effect Sensor-Assisted Nonlinear Observer (Year: 2022).*

(Continued)

*Primary Examiner* — Gabriel Agared
(74) *Attorney, Agent, or Firm* — LEE, HONG, DEGERMAN, KANG & WAIMEY

(57)     ABSTRACT

Disclosed herein are a motor safety control method that can efficiently detect an abnormality of a motor sensor configured to sense a rotational motion of a motor and control a safety operation of the motor based thereon, and a robot for implementing the method. The motor safety control method for a robot may include receiving a first motor value from a high-resolution sensor of a motor, receiving a second motor value from a low-resolution sensor of the motor, and comparing a threshold with a difference between the first motor value and the second motor value, and transmitting an operation signal to a motor driver for the motor to continue or stop operation of the motor.

19 Claims, 12 Drawing Sheets

(51) Int. Cl.

| | | |
|---|---|---|
| *G05D 1/622* | (2024.01) | |
| *H02K 11/215* | (2016.01) | |
| *H02K 11/22* | (2016.01) | |
| *H02K 21/20* | (2006.01) | |
| *H02P 6/04* | (2016.01) | |
| *H02P 6/17* | (2016.01) | |

(52) U.S. Cl.
CPC ............. *H02K 11/22* (2016.01); *H02K 21/20* (2013.01); *H02P 6/04* (2013.01); *B60L 2240/12* (2013.01); *B60L 2240/421* (2013.01); *H02P 2207/05* (2013.01)

(58) Field of Classification Search
CPC ....... H02P 6/04; H02P 2207/05; G05D 1/622; B60L 15/20; B60L 2240/421; B60L 2240/12; B25J 9/1674
USPC ...................................................... 318/400.37
See application file for complete search history.

(56) References Cited

U.S. PATENT DOCUMENTS

| | | | | |
|---|---|---|---|---|
| 2011/0221377 A1* | 9/2011 | Ueno | ....................... | G05B 9/02 318/565 |
| 2013/0241316 A1* | 9/2013 | Morikawa | ............ | H02H 1/0007 307/326 |
| 2018/0275645 A1* | 9/2018 | Matsumura | ........ | G01D 5/24461 |
| 2020/0259432 A1* | 8/2020 | Ando | ........................ | H02P 5/74 |
| 2023/0142572 A1* | 5/2023 | Pabouctsidis | ............ | G01D 3/08 318/400.21 |

FOREIGN PATENT DOCUMENTS

| | | |
|---|---|---|
| EP | 3379205 | 7/2019 |
| JP | 2013047694 | 3/2013 |
| JP | 2022047381 | 3/2022 |
| KR | 1020110032916 | 3/2011 |
| KR | 1020160035337 | 3/2016 |
| KR | 1020200006088 | 1/2020 |
| KR | 1020200052665 | 5/2020 |
| WO | 2019220719 | 11/2019 |

OTHER PUBLICATIONS

Korean Intellectual Property Office Application No. 10-2023-0080545, Notice of Allowance dated Feb. 19, 2025, 3 pages.
European Patent Office Application Serial No. 24161983.2, Search Report dated May 21, 2025, 11 pages.
Korean Intellectual Property Office Application No. 10-2023-0080545, Office Action dated Aug. 20, 2024, 7 pages.
European Patent Office Application Serial No. 24161983.2, Partial Search Report dated Sep. 10, 2024, 14 pages.
Jenssen et al., "Position Locking for Permanent Magnet Synchronous Machine Propeller Drives in Drones by Hall-Effect Sensor-Assisted Nonlinear Observer," IECON 2022 48th Annual Conference of the IEEE Industrial Electronics Society, Oct. 2022, 6 pages.
Schmidt et al., "Diverse Redundant Drive Architecture with External Diagnostics Enables Safety-Related Motor Control Based on Proven Standard Components at Low Cost," 2024 4th International Conference on Smart Gird and renewable Energy, IEEE, Jan. 2024, 14 pages.

* cited by examiner

Figure 15:
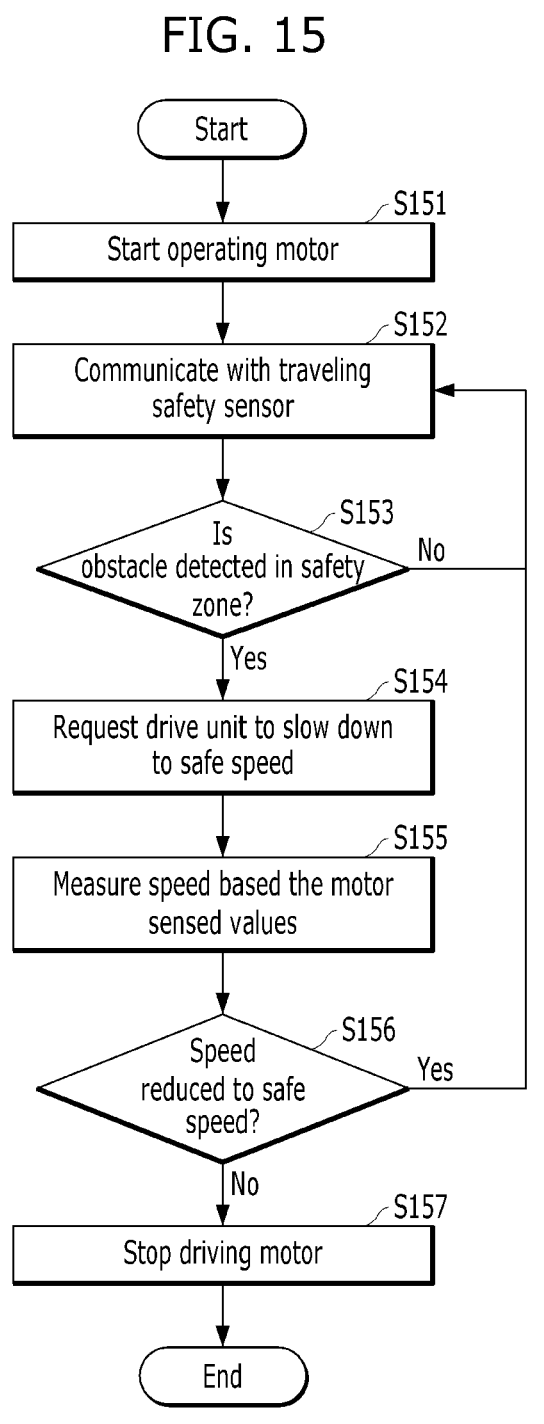

Start

— S151
Start operating motor

— S152
Communicate with traveling
safety sensor

— S153
Is
obstacle detected in safety
zone?

No

Yes

— S154
Request drive unit to slow down
to safe speed

— S155
Measure speed based the motor
sensed values

— S156
Speed
reduced to safe
speed?

Yes

No

— S157
Stop driving motor

End (16-1)

(16-2)

(16-3)

MOTOR SAFETY CONTROL METHOD AND ROBOT FOR IMPLEMENTING THE SAME

CROSS-REFERENCE TO RELATED APPLICATION

Pursuant to 35 U.S.C. § 119 (a), this application claims the benefit of earlier filing date and right of priority to Korean Application No. 10-2023-0080545, filed on Jun. 22, 2023, the contents of which are hereby incorporated by reference herein in its entirety.

BACKGROUND OF THE DISCLOSURE

Field of the Disclosure

The present disclosure relates to a motor safety control method, which may be used, for example, for driving a robot, and more particularly, to a motor safety control method employing a motor sensor for acquiring rotation data, such as a rotational position and/or a rotational speed of a motor (or a motor shaft) by sensing a rotational motion of the motor, and a robot for implementing the same.

Discussion of the Related Art

Robots have been developed for industrial use and have been a part of factory automation. Recently, robots have been used in a wider range of applications, including medical robots, aerospace robots, and even domestic robots that can be used at home. Some of these robots are capable of self-driving.

When these robots encounter objects or obstacles while traveling along a target path, they can modify the target path to avoid hitting the objects or obstacles and move toward the target location along another suitable travel path. Many studies are underway on algorithms for finding optimal travel paths and travel speeds to arrive at the target location as quickly as possible without hitting surrounding objects or obstacles.

The robot may have a motor sensor for sensing the rotational motion of the driving motor, and control the driving motor to ensure safe driving of the robot based on the rotation data that may be acquired through the motor sensor.

However, if the motor sensor configured to sense the rotation of the motor develops an abnormality, it may be dangerous for the safe driving of the robot. Therefore, it is necessary to discuss how to detect abnormalities in the motor sensor in advance and take appropriate measures when abnormalities occur.

SUMMARY OF THE DISCLOSURE

An object of the present disclosure is to provide a motor safety control method which can efficiently detect an abnormality of a motor sensor configured to sense a rotational motion of a motor and control a safe operation of the motor based on the detection, and a robot for implementing the same.

To achieve these objects and other advantages and in accordance with the purpose of the disclosure, as embodied and broadly described herein, a motor safety control method for a robot may include receiving a first motor value from a high-resolution sensor of a motor, receiving a second motor value from a low-resolution sensor of the motor, and comparing a threshold with a difference between the first motor value and the second motor value, and transmitting an operation signal to a motor driver for the motor to continue or stop operation of the motor.

The high-resolution sensor may include a motor encoder, and the low-resolution sensor may include at least one Hall sensor disposed inside the motor.

The operation signal may include an operation ongoing signal causing operation of the motor to continue, and an operation stop signal causing operation of the motor to stop.

Based on the difference between the first motor value and the second motor value being within the threshold, the operation ongoing signal may be transmitted to the motor driver. Based on the difference between the first motor value and the second motor value being beyond the threshold, the operation stop signal may be transmitted to the motor driver.

The first motor value may be input to a first speed sub-monitor and a second speed sub-monitor of a speed monitor of a safety controller, and the second motor value may be input to the first speed sub-monitor and the second speed sub-monitor.

The first motor value may be input to the second speed sub-monitor via the first speed sub-monitor, and the second motor value may be input to the first speed sub-monitor via the second speed sub-monitor.

The first speed sub-monitor may generate a first operation sub-signal by comparing the difference between the first motor value and the second motor value with the threshold, and the second speed sub-monitor may generate a second operation sub-signal by comparing the difference between the first motor value and the second motor value with the threshold. The safety controller may generate the operation signal based on the first operation sub-signal and the second operation sub-signal and output the operation signal to the motor driver.

The motor safety control method may further include inputting two motor values of another motor to the first speed sub-monitor and the second speed sub-monitor, respectively.

The motor safety control method may further include transmitting the first motor value, the second motor value, the first operation sub-signal, and the second operation sub-signal to a processor in the safety controller.

The motor safety control method may further include receiving a target travel speed of the robot from a path guider, and verifying, by the processor, correctness of the first operation sub-signal and the second operation sub-signal by comparing the target travel speed with the first motor value and the second motor value.

The motor safety control method may further include, based on a difference between the target travel speed and a travel speed of the robot according to at least one of the first motor value and the second motor value being out of a predetermined range, outputting, by the processor, the operation stop signal to the motor driver even when the first operation sub-signal and the second operation sub-signal correspond to operation ongoing signals.

The motor safety control method may further include, based on the difference between the target travel speed and the travel speed of the robot according to at least one of the first motor value and the second motor value being out of the predetermined range, transmitting, by the processor, a first control signal to the speed monitor, the first control signal causing the speed monitor to output the operation stop signal to the motor driver.

The motor safety control method may further include monitoring, by a power manager, power usage of the processor for abnormalities, and, based on the power usage of the processor being monitored as being abnormal, transmitting, by the power manager, a second control signal to the speed monitor, the second control signal causing the speed monitor to output the operation stop signal to the motor driver.

The motor safety control method may further include determining, from a traveling safety sensing signal received from a traveling safety sensor, whether there is an obstacle present in a safety zone, based on determining that the obstacle is present, requesting a drive unit to decelerate to a safe speed, and based on the motor driver not having decelerated to the safety speed within a predetermined time, outputting the operation stop signal to the motor driver.

The operation stop signal may include a safety stop (SS) signal for decelerating the robot to a target stop speed in response to detection of an abnormality of at least one of the motor, the high-resolution sensor, or the low-resolution sensor, and a safe torque off (STO) signal for blocking generation of torque by the motor after the robot is decelerated to the target stop speed.

In another aspect of the present disclosure, a robot may include a motor, a high-resolution sensor configured to sense a first motor value for the motor, a low-resolution sensor configured to sense a second motor value for the motor, a motor driver configured to provide a drive signal to the motor, and a safety controller configured to compare a threshold with a difference between the first motor value and the second motor value to provide an operation signal to the motor driver to continue or stop operation of the motor.

The safety controller may include a speed monitor configured to generate a first operation sub-signal and a second operation sub-signal based on the first motor value and the second motor value, a processor configured to verify correctness of the first operation sub-signal and the second operation sub-signal, and a power manager configured to monitor power usage of the processor for abnormalities, wherein the safety controller may be implemented as a single board and mounted on the robot.

A motor safety control method and a robot for implementing the same according to the present disclosure may have the following effects.

According to at least one of the aspects of the present disclosure, by using a Hall sensor provided inside the motor instead of a motor encoder as a motor sensor, the motor safety control method may be implemented at a lower cost.

According to at least one of the aspects of the present disclosure, by monitoring the rotation of the motor with independent dual paths (or dual logic), a more reliable motor safety control method may be implemented.

Effects obtainable from the present disclosure may be non-limited by the above-mentioned effects. And, other unmentioned effects can be clearly understood from the following description by those having ordinary skill in the technical field to which the present disclosure pertains.

BRIEF DESCRIPTION OF THE DRAWINGS

The present disclosure will become more fully understood from the detailed description given herein below and the accompanying drawings, which are given by illustration only, and thus are not limitative of the present invention.

FIG. 15 is a flowchart illustrating another process of operation of the safety controller and peripheral components of FIG. 1.

DETAILED DESCRIPTION OF THE DISCLOSURE

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It is apparent that the following embodiments are intended to embody the present disclosure and are not intended to limit or restrict the scope of the present disclosure. All techniques easily inferred by those skilled in the art from the detailed description and embodiments of the present disclosure are to be interpreted as being within the scope of the present disclosure.

The following detailed description is to be construed in all aspects as illustrative and not restrictive. The scope of the present disclosure should be determined by reasonable interpretation of the appended claims and all changes which come within the equivalent scope of the present disclosure are within the scope of the present disclosure.

Hereinafter, with reference to FIGS. 1 and 2, a safety controller and peripheral components thereof that may be used in, for example, a traveling robot will be discussed in accordance with one aspect of the present disclosure.

Figure 1:
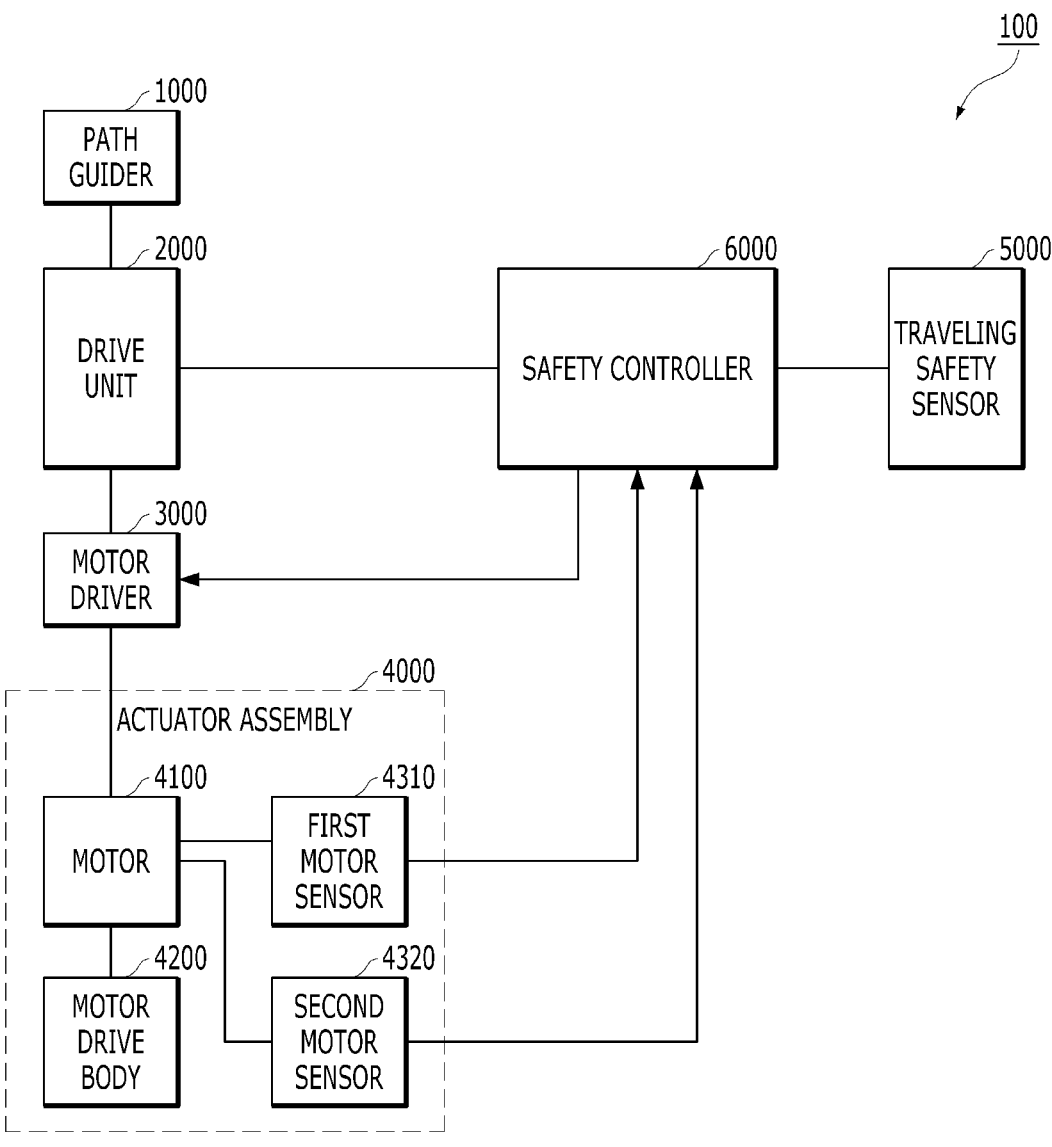
FIG. 1 is a block diagram of a safety controller and peripheral components thereof that may be provided to a robot according to one aspect of the present disclosure.

FIG. 1 is a block diagram of a safety controller and peripheral components thereof that may be provided to a robot according to one aspect of the present disclosure. FIG. 2 is a flowchart of a process of operation of the safety controller and peripheral components of FIG. 1.

While FIG. 1 illustrates that the safety controller is provided on a traveling robot, the application is not necessarily limited to traveling robots. The safety controller may be applied even to non-traveling robots (e.g., industrial assembly robots).

As shown in FIG. 1, a robot 100 may include a path guider 1000, a drive unit 2000, a motor driver 3000, an actuator assembly 4000, a traveling safety sensor 5000, and a safety controller 6000.

The path guider 1000 may generate a travel path, such as a global path or a local path, for the robot 100 to travel and provide the same to the drive unit 2000. In generating the travel path, the path guider 1000 may utilize pre-stored map information and/or utilize map-related information and/or travel path-related information received from a control server (not shown).

The drive unit 2000 may drive the actuator assembly 4000 via the motor driver 3000 to enable the robot to operate along the travel path received from the path guider 1000.

The motor driver 3000 may convert an output signal from the drive unit 2000 into a drive signal and provide the drive signal to the actuator assembly 4000.

One or more of the actuator assemblies 4000 may be provided in the robot 100, depending on the form and/or function of the robot 100. While one actuator assembly 4000 will be primarily described herein, the description can be applied to another actuator assembly 4000 provided in the robot 100.

The actuator assembly 4000 may include a motor 4100, a motor drive body 4200, a first motor sensor 4310, and a second motor sensor 4320.

The motor 4100 may rotate to move the motor drive body 4200 in response to a drive signal received from the motor driver 3000. When the robot 100 is a traveling robot, the motor drive body 4200 may be a wheel. Thus, by rotating the motor 4100 in response to the drive signal, the wheels 4200 may be driven, that is, rotated, and thus the robot 100 may travel.

A plurality of motor sensors for sensing the rotational motion of the motor 4100 may be provided in the actuator assembly 4000. While FIG. 1 illustrates two motor sensors per motor, namely a first motor sensor 4310 and a second motor sensor 4320, it is to be understood that more motor sensors may be provided.

The first motor sensor 4310 and the second motor sensor 4320 may each sense rotational motion of the motor 4100 independently of each other to acquire rotation data, such as a rotational position and/or a rotational speed.

The first motor sensor 4310 and the second motor sensor 4320 may sense rotational motion at different resolutions. For example, the first motor sensor 4310 may be a high-resolution motor sensor and the second motor sensor 4320 may be a low-resolution motor sensor.

For example, the first motor sensor 4310 may be a high-resolution motor encoder and the second motor sensor 4320 may be a low-resolution motor encoder. In other words, the second motor sensor 4320 may be less expensive than the first motor sensor 4310.

Alternatively, the second motor sensor 4320 may be a high-resolution motor sensor and the first motor sensor 4310 may be a low-resolution motor sensor.

A motor encoder can be understood as a sensor that outputs multiple pulses per revolution (PPR) as the motor shaft makes one revolution. For example, the PPR of a motor encoder being 100 means that the motor encoder outputs 100 pulses per revolution of the motor shaft. Therefore, as the PPR increases, the resolution at which the motor encoder can sense the rotational motion of the motor increases. In other words, the higher the PPR, the more expensive the motor encoder may be.

For example, an optical motor encoder may include a light emitting element (e.g., a light emitting diode (LED)) configured to emit light, a light receiving element (photo sensor) configured to receive the light, and a slit disk positioned between the light emitting element and the light receiving element. As the slit disk rotates with the rotational shaft of the motor, the light from the light emitting diode passing through the slit in the slit disk is sensed by the light receiving element. Thereby, the optical motor encoder may output a plurality of pulses corresponding to the rotation of the motor.

Of course, the second motor sensor 4320 may be implemented as another low-cost, low-resolution sensor (e.g., a Hall sensor) rather than the motor encoder as a sensor to sense the rotation of the motor. For example, the first motor sensor 4310 may be configured as a motor encoder of either high or low resolution, and the second motor sensor 4320 may be configured as a Hall sensor of lower resolution.

Operation of the safety controller 400 based on sensed values from the first motor sensor 4310 and the second motor sensor 4320 will be described with reference to FIG. 2.

The sensed value of the first motor sensor (i.e., first rotation data) and the sensed value of the second motor sensor (i.e., second rotation data) sensed by the first motor sensor 4310 and the second motor sensor 4320, respectively, may be provided to the safety controller 6000 [S21].

The safety controller 6000 may temporarily store the sensed value of the first motor sensor and the sensed value of the second motor sensor [S22]. This is for comparison of the sensed value of the first motor sensor and the sensed value of the second motor sensor, which will be described below, and may be omitted. Hereinafter, the sensed value of the first motor sensor and the sensed value of the second motor sensor may be referred to as a first motor sensed value (or first motor value) and a second motor sensed value (second motor value), respectively.

The safety controller 6000 may determine whether the difference between the first motor sensed value and the second motor sensed value is within a preset threshold [S23]. That is, the safety controller 6000 may calculate a first rotational speed of the motor 4100 based on the first rotation data and a second rotational speed of the motor 4100 based on the second rotation data, and determine whether the difference between the first rotational speed and the second rotational speed is within the preset threshold [S23].

When the difference between the first motor sensed value and the second motor sensed value (i.e., the speed difference between the first rotational speed and the second rotational speed) is within the preset threshold, the safety controller 6000 may determine that both the first motor sensor 4310 and the second motor sensor 4320 are operating normally, and may output an operation ongoing signal [S24]. Then, the motor driver 3000 may be caused to continue driving the motor 4100 according to the operation ongoing signal.

However, when the difference between the first motor sensed value and the second motor sensed value is beyond the preset threshold, the safety controller 6000 may determine that at least one of the first motor sensor 4310 and the second motor sensor 4320 is operating abnormally, and may output an operation stop signal to the motor driver 3000 [S25]. Then, the motor driver 3000 may stop driving the motor 4100 and/or cut off the power supplied to the motor 4100 in response to the operation stop signal. Thus, the robot 100 may stop traveling.

That is, the operation stop signal may correspond to a safety stop (SS) signal input to the motor driver 3000 to stop driving the motor 4100 (to slow down the rotational speed of the motor 4100). Alternatively, the operation stop signal may correspond to a safety torque off (STO) signal that is input to the motor driver 3000 to cut off the power supplied to the motor and/or to stop the motor from generating torque.

The safety controller 6000 may receive various sensing signals related to traveling safety from the traveling safety sensor 5000. The traveling safety sensor 5000 may be intended to prevent collisions between the robot 100 and external objects, for example, during traveling, and may include at least one of a LiDAR sensor, a vision sensor (e.g., a camera), or a depth sensor to sense external objects. The safety controller 6000 may analyze the sensing signals related to traveling safety and output an operation stop signal to the motor driver 3000 upon determining that traveling safety is at risk (e.g., a collision with an external object is expected). The motor driver 3000 may then stop driving the motor 4100 and/or cut off the power supplied to the motor 4100 in response to the operation stop signal. Thus, the robot 100 may stop traveling and prevent a collision.

The operation of the safety controller and its peripheral components configured in this manner will now be described.

Figure 3:
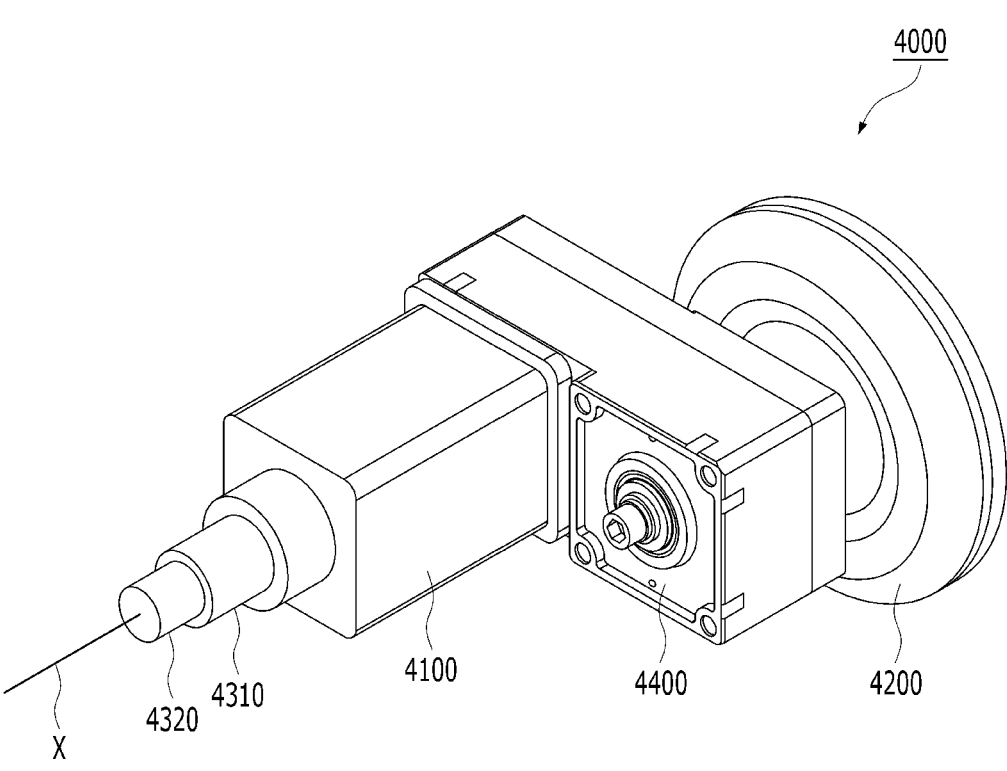
FIG. 3 is a perspective view of an actuator assembly that may be provided in a robot according to one aspect of the present disclosure.

Hereinafter, one example of the actuator assembly 4000 of FIG. 1 will be discussed with reference to FIG. 3. FIG. 3 is a perspective view of an actuator assembly that may be provided in a robot according to one aspect of the present disclosure.

A decelerator 4400 configured to decelerate the wheels 4200 may be provided between one side of the motor 4100 and the motor drive body 4200. Also, a first motor encoder and a second motor encoder, as the first motor sensor 4310 and the second motor sensor 4320, may be provided on the rotation shaft of the motor 4100 on the opposite side of the motor 4100 so as to be arranged side by side along the longitudinal direction of the rotation axis X in an overlapping manner.

In general, for the traveling robot 100, a pair of actuator assemblies 4000 may be provided side by side in the direction of the rotation axis X. The actuator assembly 4000 is bound to be bulky. In this case, as the first motor encoder 4310 and the second motor encoder 4320 are arranged in the longitudinal direction of the rotation axis X, the distance between the two wheels may increase in proportion to the length of the first motor encoder 4310 and the second motor encoder 4320, and thus the width of the traveling robot 100 may increase accordingly. Furthermore, as discussed above, the first motor encoder 4310 and the second motor encoder 4320 are expensive parts, regardless of their resolution.

Figure 4:
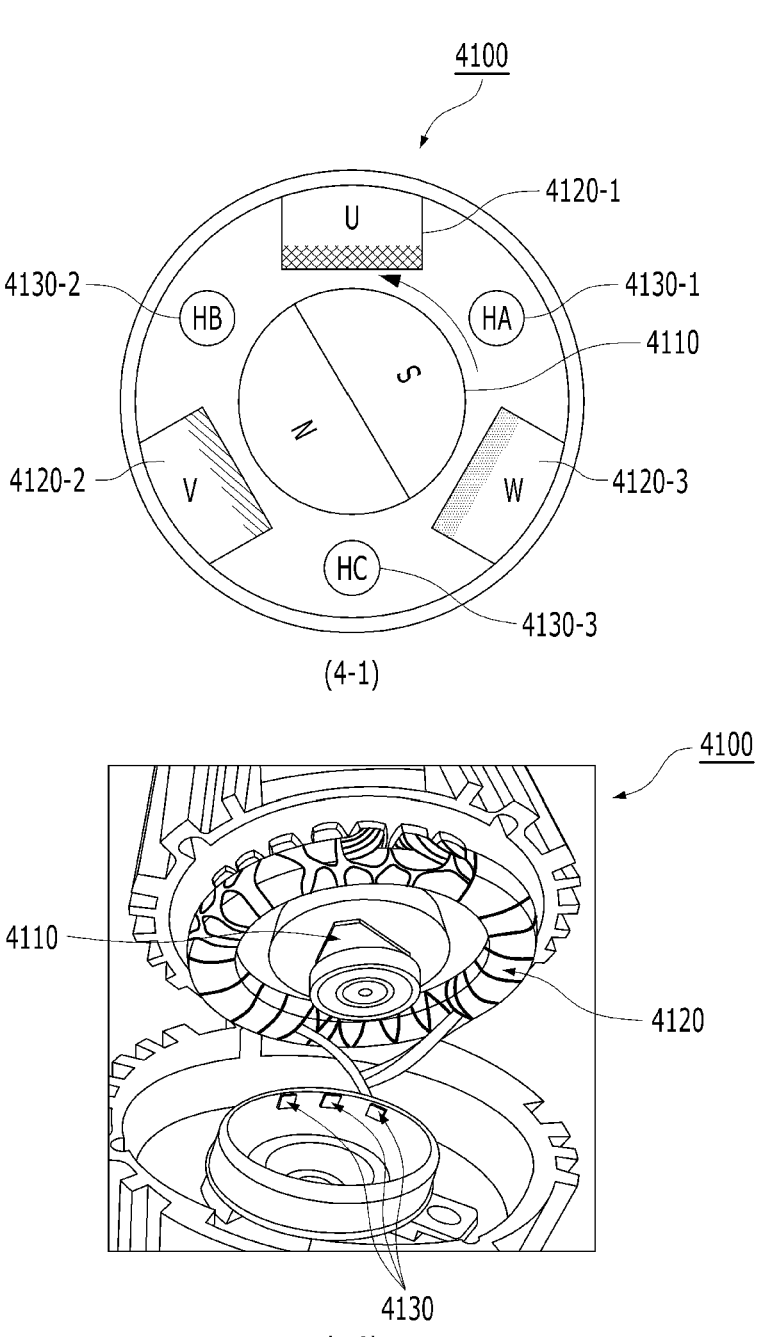
FIG. 4 is a cross-sectional view and exploded view of a motor according to one aspect of the present disclosure.
Figure 5:
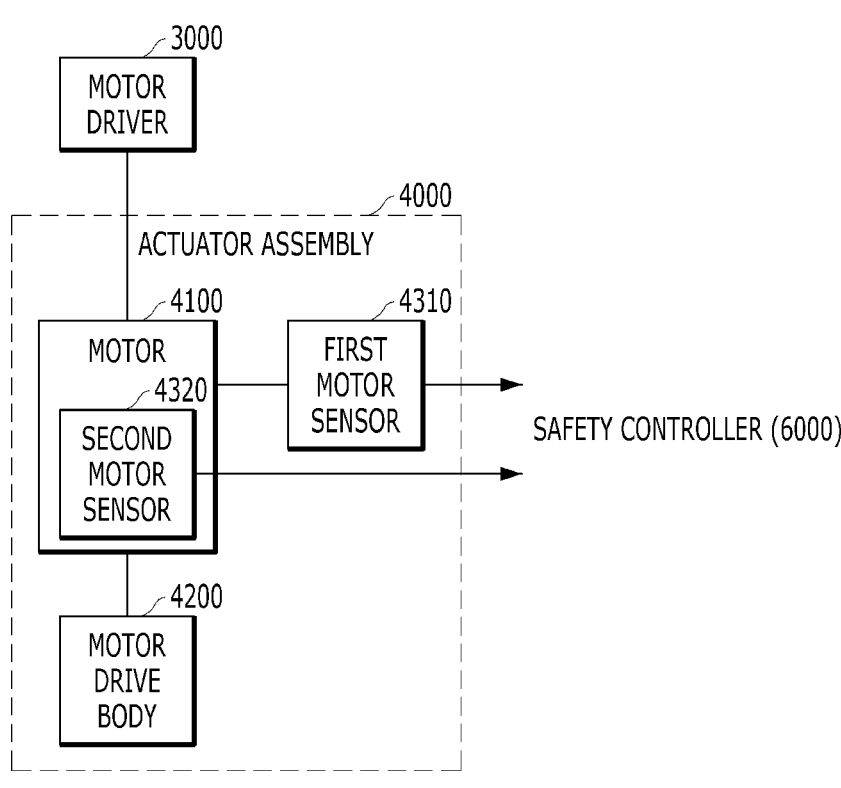
FIG. 5 is a block diagram of a variation of the actuator assembly of FIG. 1.

Hereinafter, a variation of the actuator assembly 4000 of FIG. 1 will be discussed with reference to FIGS. 4 and 5. FIG. 4 is a cross-sectional view and exploded view of a motor according to one aspect of the present disclosure. FIG. 5 is a block diagram of a variation of the actuator assembly of FIG. 1.

As shown at 4-1 and 4-2 in FIG. 4, a motor 4100 that may be employed in the present disclosure may include a rotor 4110 composed of a permanent magnet, a stator 4120 (or 4120-1 to 4120-3) composed of coil windings, and at least one Hall sensor 4130 (or 4130-1 to 4130-3) configured to sense rotation of the motor shaft.

As shown in FIG. 5, the Hall sensor 4130 of the motor 4100 may be used as the second motor sensor 4320.

In this configuration, which is different from the actuator assembly 4000 of FIG. 1, the previously described motor encoder may still be used as the first motor sensor 4310, while the Hall sensor 4130 of the motor 4100 may be used as the second motor sensor 4320. The actuator assembly configured in this manner may be less bulky than the actuator assembly of FIG. 1.

The first sensed value (i.e., first rotation data) and the second sensed value (i.e., second rotation data) sensed by the motor encoder 4310 and the Hall sensor 4320, respectively, may be provided to the safety controller 6000.

The safety controller 6000 may determine whether the difference between the first sensed value and the second sensed value is within a preset threshold. For example, the safety controller 6000 may calculate a first rotational speed of the motor 4100 based on the first sensed value and a second rotational speed of the motor 4100 based on the second sensed value, and determine whether the difference between the first rotational speed and the second rotational speed is within a preset threshold.

When the difference between the first sensed value and the second sensed value (e.g., the speed difference between the first rotational speed and the second rotational speed) is within the preset threshold, the safety controller 6000 may determine that both the first motor sensor 4310 and the second motor sensor 4320 are operating normally, and may output an operation ongoing signal. The motor driver 3000 may then cause the motor driver 3000 to continue to drive the motor 4100 according to the operation ongoing signal.

However, when the difference between the first sensed value and the second sensed value is beyond the preset threshold, the safety controller 6000 may determine that at least one of the first motor sensor 4310 and the second motor sensor 4320 is operating abnormally, and may output an operation stop signal to the motor driver 3000. Then, the motor driver 3000 may stop driving the motor 4100 and/or cut off the power supplied to the motor 4100 in response to the operation stop signal. Thus, the robot 100 may stop traveling.

Figure 6:
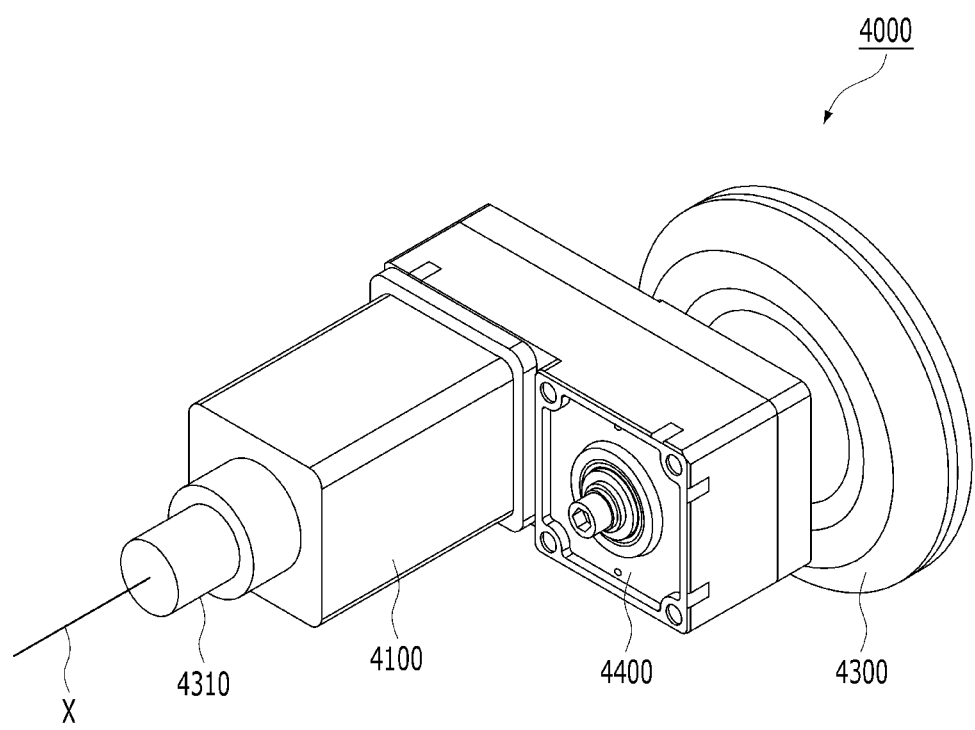
FIG. 6 is a perspective view of an actuator assembly that may be provided to a robot according to one aspect of the present disclosure.

Hereinafter, one example of the actuator assembly 4000 of FIG. 5 will be discussed with reference to FIG. 6. FIG. 6 is a perspective view of an actuator assembly that may be provided to a robot according to one aspect of the present disclosure.

A decelerator 4400 configured to decelerate the wheels 4200 may be provided between one side of the motor 4100 and the motor drive body 4200. Also, a first motor encoder may be provided as the first motor sensor 4310 on the rotation shaft of the motor 4100 on the opposite side of the motor 4100 so as to be arranged along the longitudinal direction of the rotation axis X in an overlapping manner. The Hall sensor 4130 in the motor 4100 may be used as the second motor sensor 4320.

As described above, for the traveling robot 100, a pair of actuator assemblies 4000 may be provided side by side in the direction of the rotation axis X. Unlike the actuator assembly of FIG. 3, only one motor encoder 4310 is provided for each actuator assembly in the longitudinal direction of the rotation axis X. As a result, the distance between the two wheels may be reduced, and the width of the traveling robot 100 may be reduced accordingly. Further, unlike the actuator assembly of FIG. 3, only one motor encoder 4310 is used for each actuator assembly, which may result in a lower manufacturing cost.

Figure 7:
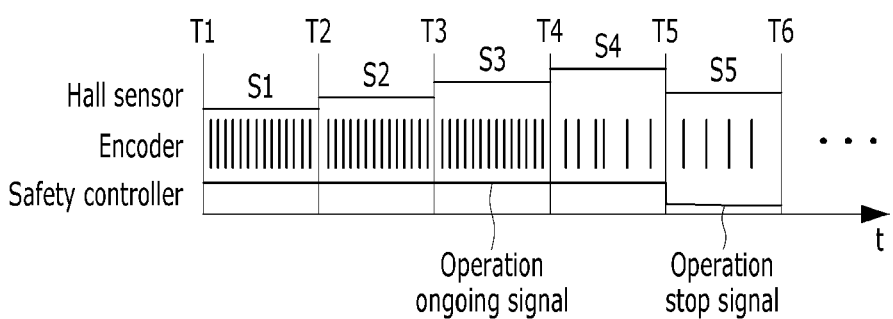
FIG. 7 illustrates an example of a first motor sensing signal, a second motor sensing signal, and an operation signal according to one aspect of the present disclosure.

Hereinafter, an example of signals output by the first motor sensor 4310 (i.e., motor encoder) and the second motor sensor 4320 (i.e., Hall sensor) of the actuator assembly 4000 of FIG. 5, and an operation signal output accordingly will be discussed with reference to FIG. 7. FIG. 7 illustrates an example of a first motor sensing signal, a second motor sensing signal, and an operation signal according to one aspect of the present disclosure.

The Hall sensor 4320 may output a step signal in which a plurality of steps (or levels) (S1, S2, S3, . . . , SN) is repeated per 360 degree rotation of the motor 4100. The number and shape of the plurality of steps may be determined by the number and arrangement of Hall sensors in the motor. For example, when three Hall sensors are provided in the motor, the signal may have a total of six steps. A step change in the step signal at a predetermined time interval (first to second time interval (T1 to T2), second to third time interval (T2 to T3), . . . ) may mean that the Hall sensor 4320 senses the motor 4100 rotating at a predetermined speed. When the predetermined time interval is long, the motor 4100 may be rotating at a low speed. When the predetermined time interval is short, the motor 4100 may be rotating at a high speed. When the predetermined time interval remains constant, the motor 4100 may be rotating at a constant speed. When the predetermined time interval gets longer and longer, it may mean that the motor 4100 may be gradually slowing down. When the predetermined time interval gets shorter and shorter, it may mean that the motor 4100 may be gradually speeding up.

When three Hall sensors are used, the rotational speed may be calculated by sensing changes in their signals. In other words, the Hall sensor changes are divided into six steps, and the (radian) distance corresponding to the first step may be calculated, and the time (sec) traveled, for example, may be measured using the interrupt and timer functions inside the safety controller.

An example equation for calculating the rotational speed of the motor using a Hall sensor is shown below.

$$\text{Hall sensor speed (radian/sec)} = [\text{Step 1} * 2PI(\text{radian})]$$
$$/[\text{Step 6} * \text{Number of pole pairs} * \text{Gear ratio} * \text{Step 1 travel time (sec)}]$$

The motor encoder 4310 may output a pulse signal having a pulse interval that is inversely proportional to the rotational speed of the motor 4100. A longer pulse interval may indicate that the motor 4100 is rotating at a lower speed, and a shorter pulse interval may indicate that the motor 4100 is rotating at a higher speed. When the pulse interval remains constant, the motor 4100 may rotate at a constant speed. When the pulse interval becomes longer, the motor 4100 may rotate at a lower speed. When the pulse interval becomes shorter, the motor 4100 may rotate at a higher speed. The number of pulses generated per 360-degree rotation of the motor 4100 may depend on the resolution of the motor encoder 4310. In other words, the number of pulses generated per 360-degree rotation of the motor 4100 may be proportional to the resolution of the motor encoder 4310.

The speed may be calculated by determining the change in the count of the motor encoder at regular intervals. An example equation for calculating the rotational speed of the motor using the motor encoder is shown below.

$$\text{Encoder speed (radian/sec)} = [\text{Encoder count change value} * 2PI(\text{radian})]$$
$$/[\text{Encoder count value per revolution} * \text{gear ratio} * \text{period (sec)}]$$

In FIG. 7, it is assumed that both the output signal of the Hall sensor 4310 and the output signal of the motor encoder 4320 between the first time T1 and the fourth time point T4 correspond to the first speed (i.e., the same speed) of the motor 4100.

Depending on the output signal of the Hall sensor 4310 and the output signal of the motor encoder 4320 between the first time T1 and the fourth time T4, the safety controller 6000 may output a high-level signal to the motor driver 3000. The high-level signal indicates that both the motor encoder 4310 and the Hall sensor 4320 are operating normally, which may correspond to the operation ongoing signal described above. Thus, the motor driver 3000 may continue to drive the motor 4100.

However, after the fourth time T4, the output signal of the Hall sensor 4310 corresponds to the first speed of the motor 4100, but the output signal of the motor encoder 4320 corresponds to the second speed of the motor 4100, which may mean that the output signals correspond to different speeds. Assume that the difference between the first speed and the second speed is above a threshold.

When the difference between the first speed and the second speed continues to be above the threshold for a certain period of time, the safety controller 6000 may output a low-level signal to the motor driver 3000. The low-level signal may indicate that at least one of the motor encoder 4310 and the Hall sensor 4320 is operating abnormally. That is, the low-level signal may correspond to the operation stop signal described above. Accordingly, the motor driver 3000 may continue to drive the motor 4100. In response to the low-level signal, the motor driver 3000 may stop driving the motor 4100 and/or cut off the power supplied to the motor 4100. Thus, the robot 100 may stop traveling.

In the case where the power supplied to the motor 4100 is cut off in response to the operation stop signal, the high-level operation ongoing signal and the low-level operation stop signal may be for implementing a safety torque off (STO) function of the motor.

The aforementioned operation ongoing signal and operation stop signal are not limited to the high-level signal and the low-level signal, respectively. Conversely, the operation ongoing signal and the operation stop signal may be a low-level signal and a high-level signal, respectively. Alternatively, the operation ongoing signal and the operation stop signal may each be configured as a signal of another waveform.

Figure 8:
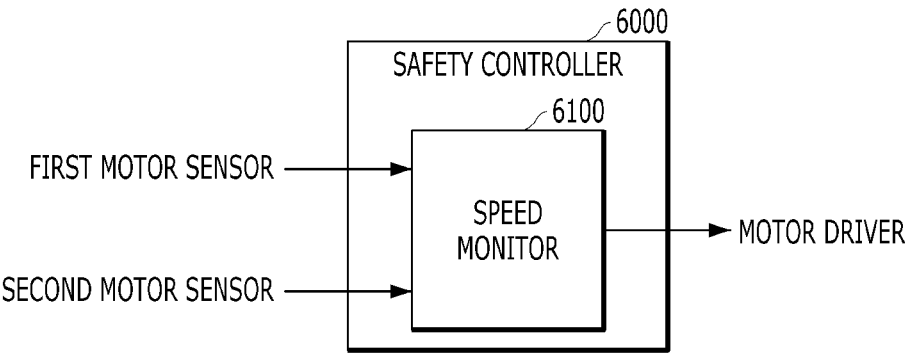
FIGS. 8 to 10 illustrate an example of the safety controller of FIG. 1.

Hereinafter, the aforementioned internal configuration of the safety controller 6000 will be discussed in more detail with reference to FIG. 8. FIG. 8 illustrates one example of the safety controller of FIG. 1.

The safety controller 6000 may include a speed monitor 6100.

The speed monitor 6100 may receive a first motor sensed value input from the first motor sensor 4310 and a second motor sensed value input from the second motor sensor 4320.

The speed monitor 6100 may compare the first motor sensed value with the second motor sensed value and output an operation signal, such as an operation ongoing signal or an operation stop signal, to the motor driver 3000. Regarding the operation ongoing signal or the operation stop signal being generated by comparing the first motor sensing value and the second motor sensing value, a description has been given above.

Figure 9:
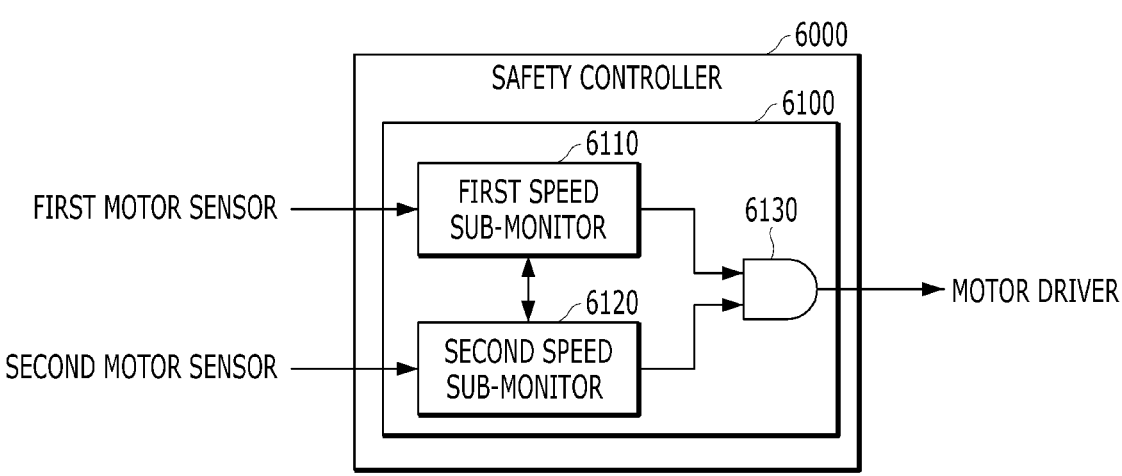

Hereinafter, the internal configuration of the speed monitor of FIG. 8 will be described in more detail with reference to FIG. 9. FIG. 9 illustrates one example of the safety controller of FIG. 1.

As shown in FIG. 9, the safety controller 6000 may include a speed monitor 6100, which includes a first speed sub-monitor 6110 and a second speed sub-monitor 6120.

The first motor sensed value of the first motor sensor 4310 may be input to the first speed sub-monitor 6110, and the second motor sensed value of the second motor sensor 4320 may be input to the second speed sub-monitor 6120.

The first speed sub-monitor 6110 may compute a first rotational speed of the first motor sensor 4310 based on the first motor sensed value, and the second speed sub-monitor 6120 may compute a second rotational speed of the second motor sensor 4320 based on the second motor sensed value.

The first speed sub-monitor 6110 may provide the first motor sensed value or first rotational speed to the second speed sub-monitor 6120, and the second speed sub-monitor 6120 may provide the second motor sensed value or second rotational speed to the first speed sub-monitor 6110.

When the second speed sub-monitor 6120 receives the first motor sensed value from the first speed sub-monitor 6110, it may compute the first rotational speed based on the received value. When the first speed sub-monitor 6110 receives the second motor sensed value from the second speed sub-monitor 6120, it may compute the second rotational speed based on the received value.

Based on the first rotational speed and the second rotational speed, the first speed sub-monitor 6110 may output a first operation signal, that is, a first operation ongoing signal or a first operation stop signal. The first operation signal, namely, the first operation ongoing signal and the first operation stop signal, may not be directly output to the motor driver 3000. Therefore, the first operation signals (i.e., the first operation ongoing signal and the first operation stop signal) may be referred to as first operation sub-signals (the first operation ongoing sub-signal and the first operation stop sub-signal) to distinguish them from the operation signals (i.e., the operation ongoing signal and the operation stop signal) that are output to the motor driver 3000 as described above.

The second speed sub-monitor 6120 may also output a second operation signal, such as a second operation ongoing signal or a second operation stop signal, based on the first rotational speed and the second rotational speed. The second operation signal, namely, the second operation ongoing signal and the second operation stop signal, may not be directly output to the motor driver 3000. Therefore, the second operation signals (the second operation ongoing signal and the second operation stop signal) may be referred to as second operation sub-signals (the second operation ongoing sub-signal and the second operation stop sub-signal) to distinguish them from the operation signals (the operation ongoing signal and the operation stop signal) output to the motor driver 3000 described above.

As for the operation sub-signal being generated by comparing the first rotational speed (or first motor sensed value) and the second rotational speed (or second motor sensed value), the same process for generating the operation signal as described above may be used.

The first speed sub-monitor 6110 and the second speed sub-monitor 6120 may output operation signals based on the first rotation speed and the second rotation speed independently of each other. In other words, the first speed sub-monitor 6110 and the second speed sub-monitor 6120 may perform monitoring that compares the first motor sensed value and the second motor sensed value.

Here, it is assumed that the first operation ongoing signal and the second operation ongoing signal are high-level signals, and the first operation stop signal and the second operation stop signal are low-level signals.

In this case, the first operation signal and the second operation signal may be input to the AND gate 6130. The AND gate 6130 may be provided in the speed monitor 6100, or may be provided outside of the speed monitor 6100.

When both the first operation signal and the second operation signal are operation ongoing signals (i.e., the first operation signal is the first operation ongoing signal and the second operation signal is the second operation ongoing signal), the AND gate 6130 outputs an operation ongoing signal (i.e., a high-level signal). When at least one of the first operation signal and the second operation signal is an operation stop signal (i.e., the first operation signal is the first operation stop signal and/or the second operation signal is the second operation stop signal), the AND gate 6130 outputs an operation stop signal (i.e., a low-level signal). The output signal of the AND gate 6130 is provided to the motor driver 3000.

Figure 10:
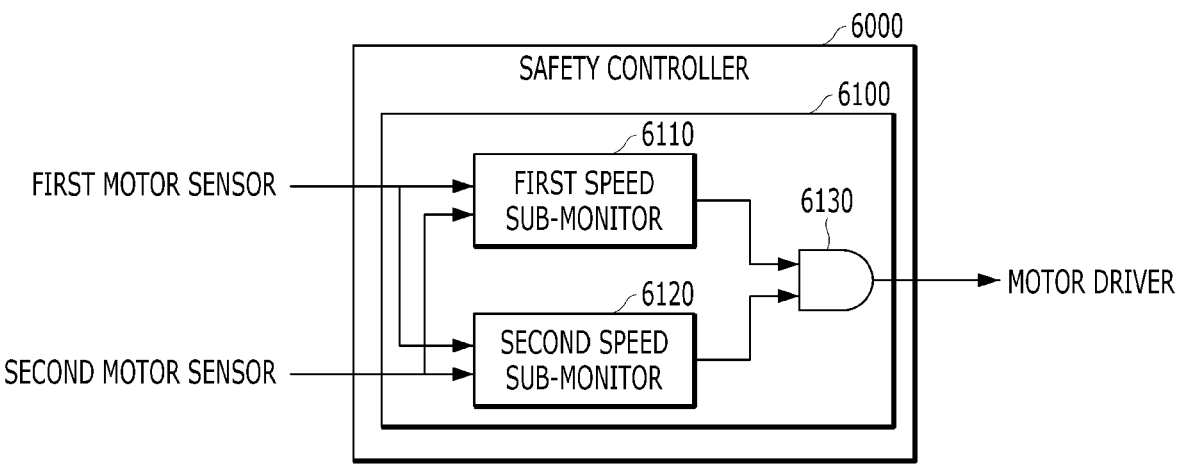

Hereinafter, a variation of the speed monitor of FIG. 9 will be discussed in more detail with reference to FIG. 10. FIG. 10 illustrates one example of the safety controller of FIG. 1.

As shown in FIG. 10, the safety controller 6000 may include a speed monitor 6100, which includes a first speed sub-monitor 6110 and a second speed sub-monitor 6120.

A first motor sensed value from the first motor sensor 4310 may be branched and input to the first speed sub-monitor 6110 and the second speed sub-monitor 6120, respectively, and a second motor sensed value from the second motor sensor 4320 may be branched and input to the first speed sub-monitor 6110 and the second speed sub-monitor 6120, respectively.

The first speed sub-monitor 6110 may compute a first rotational speed and a second rotational speed based on the first motor sensed value and the second motor sensed value, and the second speed sub-monitor 6120 may also compute a first rotational speed and a second rotational speed based on the first motor sensed value and the second motor sensed value.

The first speed sub-monitor 6110 may output a first operation signal, namely a first operation ongoing signal or a first operation stop signal, based on the first rotational speed and the second rotational speed.

The second speed sub-monitor 6120 may output a second operation signal, namely a second operation ongoing signal or a second operation stop signal, based on the first rotational speed and the second rotational speed.

Regarding the operation ongoing signal or operation stop signal being generated by comparing the first rotational speed (or first motor sensed value) with the second rotational speed (or second motor sensed value), a description has been given above.

The first speed sub-monitor 6110 and the second speed sub-monitor 6120 may output operation signals based on the first rotation speed and the second rotation speed independently of each other. In other words, the first speed sub-monitor 6110 and the second speed sub-monitor 6120 may perform monitoring that compares the first motor sensed value and the second motor sensed value.

Here, it is assumed that the first operation ongoing signal and the second operation ongoing signal are high-level signals, and the first operation stop signal and the second operation stop signal are low-level signals.

In this case, the first operation signal and the second operation signal may be input to the AND gate 6130. The AND gate 6130 may be provided in the speed monitor 6100, or may be provided outside of the speed monitor 6100.

When both the first operation signal and the second operation signal are operation ongoing signals (i.e., the first operation signal is the first operation ongoing signal and the second operation signal is the second operation ongoing signal), the AND gate 6130 outputs an operation ongoing signal (i.e., a high-level signal). When at least one of the first operation signal and the second operation signal is an operation stop signal (i.e., the first operation signal is the first operation stop signal and/or the second operation signal is the second operation stop signal), the AND gate 6130 outputs an operation stop signal (i.e., a low-level signal). The output signal of the AND gate 6130 is provided to the motor driver 3000.

Figure 11:
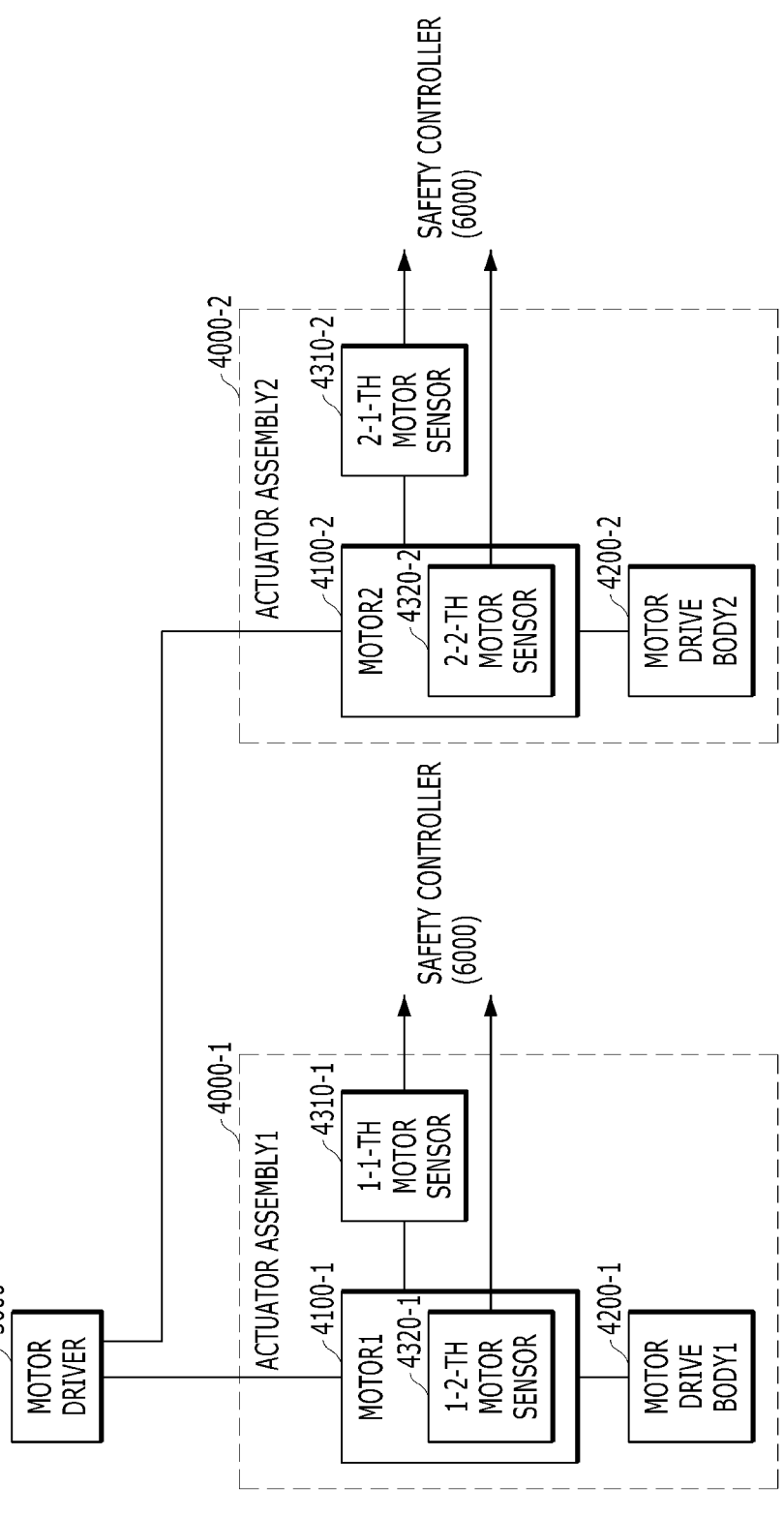
FIG. 11 is a block diagram of a plurality of actuator assemblies, which is a variation of the actuator assembly of FIG. 5.

The speed monitor 6100 may be used for two or more motors (i.e., two or more actuator assemblies). The two or more motors may be for each of two or more wheels mounted on the traveling robot 100. This is discussed further with reference to FIG. 11. FIG. 11 is a block diagram of a plurality of actuator assemblies, which is a variation of the actuator assembly of FIG. 5.

The motor driver 3000 may operate for two or more actuator assemblies. Specifically, the motor driver 3000 may convert an output signal for a first actuator assembly of the drive unit 2000 into a drive signal and provide the drive signal to a first actuator assembly 4000-1, and convert an output signal for a second actuator assembly of the drive unit 2000 into a drive signal and provide the drive signal to a second actuator assembly 4000-2.

While the motor driver 3000 is illustrated in FIG. 11 as operating for the first actuator assembly 4000-1 and the second actuator assembly 4000-2, it may operate for more actuator assemblies.

For example, the first actuator assembly 4000-1 may be used for a traveling wheel on one side of the traveling robot 100, and the second actuator assembly 4000-2 may be used for a traveling wheel on the opposite side of the traveling robot 100.

The first actuator assembly 4000-1 may include a first motor 4100-1, a 1-1-th motor sensor 4310-1, a 1-2-th motor sensor 4320-1, and a first motor drive body 4200-1. While the 1-2-th motor sensor 4320-1 is illustrated as being configured as a Hall sensor in the first motor 4100-1, it may be configured as a motor encoder separate from the first motor 4100-1. The 1-1-th motor sensor 4310-1 and the 1-2-th motor sensor 4320-1 may correspond to the first motor sensor 4310 and the second motor sensor 4320 described above for the first motor 4100-1, respectively.

A 1-1-th motor sensed value (i.e., 1-1-th rotation data) and a 1-2-th motor sensed value (i.e., 1-2-th rotation data) sensed by the 1-1-th motor sensor 4310-1 and the 1-2-th motor sensor 4320-1, respectively, may be provided to the safety controller 6000. The 1-1-th motor sensed value and the 1-2-th motor sensed value may correspond to the first motor sensed value and the second motor sensed value described above for the first motor 4100-1, respectively.

The second actuator assembly 4000-2 may include a second motor 4100-2, a 2-1-th motor sensor 4310-2, a 2-2-th motor sensor 4320-2, and a second motor drive body 4200-2. While the 2-2-th motor sensor 4320-2 is illustrated as being configured as a Hall sensor in the second motor 4100-2, it may be configured as a motor encoder separate from the second motor 4100-2. The 2-1-th motor sensor 4310-2 and the 2-2-th motor sensor 4320-2 may correspond to the first motor sensor 4310 and the second motor sensor 4320 described above for the second motor 4100-2, respectively.

The 2-1-th motor sensed value (i.e., 2-1-th rotation data) and the 2-2-th motor sensed value (i.e., 2-2-th rotation data) sensed by the 2-1-th motor sensor 4310-2 and the 2-2-th motor sensor 4320-2, respectively, may be provided to the safety controller 6000. The 2-1-th motor sensed value and the 2-2-th motor sensed value may correspond to the first motor sensed value and the second motor sensed value described above for the second motor 4100-2, respectively.

Figure 12:
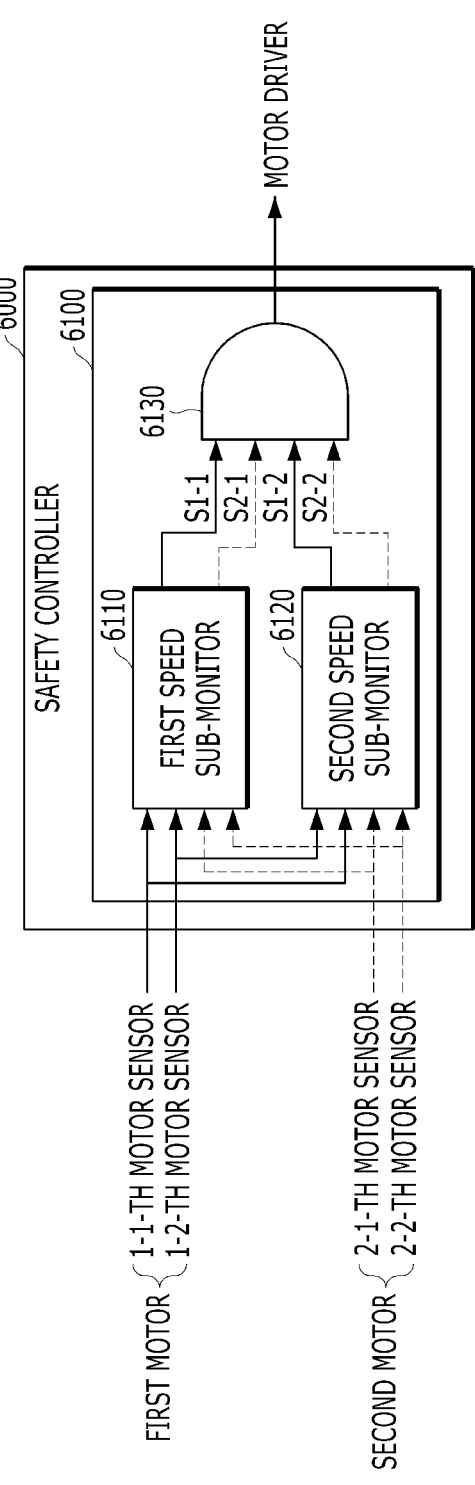
FIG. 12 illustrates an example of a safety controller for the plurality of actuator assemblies of FIG. 11.

The operation of the safety controller 6000 receiving the 1-1-th motor sensed value, the 1-2-th motor sensed value, the 2-1-th motor sensed value, and the 2-2-th motor sensed value will be described with further reference to FIG. 12. FIG. 12 illustrates an example of a safety controller for the plurality of actuator assemblies of FIG. 11.

The 1-1-th motor sensed value of the 1-1-th motor sensor 4310-1 may be branched and input to the first speed sub-monitor 6110 and the second speed sub-monitor 6120, respectively, and the 1-2-th motor sensed value of the 1-2-th motor sensor 4320-1 may be branched and input to the first speed sub-monitor 6110 and the second speed sub-monitor 6120, respectively.

The 2-1-th motor sensed value of the 2-1-th motor sensor 4310-2 may be branched and input to the first speed sub-monitor 6110 and the second speed sub-monitor 6120, respectively, and the 2-2-th motor sensed value of the 2-2-th motor sensor 4320-2 may be branched and input to the first speed sub-monitor 6110 and the second speed sub-monitor 6120, respectively.

The first speed sub-monitor 6110 may compute a 1-1-th rotational speed and a 1-2-th rotational speed of the first motor 4100-1 based on the 1-1-th motor sensed value and the 1-2-th motor sensed value, and the second speed sub-monitor 6120 may also compute a 1-1-th rotational speed and a 1-2-th rotational speed of the first motor 4100-1 based on the 1-1-th motor sensed value and the 1-2-th motor sensed value.

The first speed sub-monitor 6110 may output a 1-1-th operation signal S1-1, namely a 1-1-th operation ongoing signal or a 1-1-th operation stop signal, based on the 1-1-th rotational speed and the 1-2-th rotational speed. The 1-1-th operation signal S1-1 may correspond to the aforementioned first operation sub-signal attributed to the first motor. The 1-1-th operation signal S1-1, namely the 1-1-th operation ongoing signal and the 1-1-th operation stop signal, may not be directly output to the motor driver 3000. Therefore, the 1-1-th operation signals (i.e., the 1-1-th operation ongoing signal and 1-1-th operation stop signal) may be referred to as 1-1-th operation sub-signals (1-1-th operation ongoing sub-signal and 1-1-th operation stop sub-signal) to distinguish them from the operation signals (operation ongoing signal and operation stop signal) output to the motor driver 3000 described above.

The second speed sub-monitor 6120 may output a 1-2-th operation signal S1-2, namely a 1-2-th operation ongoing signal or a 1-2-th operation stop signal, based on the 1-1-th rotational speed and the 1-2-th rotational speed. The 1-2-th operation signal S1-2 may correspond to the aforementioned second operation sub-signal attributed to the first motor. The 1-2-th operation signals S1-2, namely the 1-2-th operation ongoing signal and the 1-2-th operation stop signal, may not be directly output to the motor driver 3000. Therefore, the 1-2-th operation signals (i.e., the 1-2-th operation ongoing signal and 1-2-th operation stop signal) may be referred to as 1-2-th operation sub-signals (1-2-th operation ongoing sub-signal and 1-2-th operation stop sub-signal) to distinguish them from the operation signals (operation ongoing signal and operation stop signal) output to the motor driver 3000 described above.

The second speed sub-monitor 6120 may compute a 2-1-th rotational speed and a 2-2-th rotational speed of the second motor 4100-2 based on the 2-1-th motor sensed value and the 2-2-th motor sensed value, and the first speed sub-monitor 6110 may also compute a 2-1-th rotational speed and a 2-2-th rotational speed of the second motor 4100-2 based on the 2-1-th motor sensed value and the 2-2-th motor sensed value.

The first speed sub-monitor 6110 may output a 2-1-th operation signal S2-1, namely a 2-1-th operation ongoing signal or a 2-1-th operation stop signal, based on the 2-1-th rotational speed and the 2-2-th rotational speed. The 2-1-th operation signal S2-1 may correspond to the aforementioned first operation sub-signal attributed to the second motor. The 2-1-th operation signal S2-1, namely the 2-1-th operation ongoing signal and the 2-1-th operation stop signal, may not be directly output to the motor driver 3000. Therefore, the 2-1-th operation signals (i.e., the 2-1-th operation ongoing signal and 2-1-th operation stop signal) may be referred to as 2-1-th operation sub-signals (2-1-th operation ongoing sub-signal and 2-1-th operation stop sub-signal) to distinguish them from the operation signals (operation ongoing signal and operation stop signal) output to the motor driver 3000 described above.

The second speed sub-monitor 6120 may output a 2-2-th operation signal S2-2, namely a 2-2-th operation ongoing signal or a 2-2-th operation stop signal, based on the 2-1-th rotational speed and the 2-2-th rotational speed. The 2-2-th operation signal S2-2 may correspond to the aforementioned second operation sub-signal attributed to the second motor. The 2-2-th operation signals S2-2, namely the 2-2-th operation ongoing signal and the 2-2-th operation stop signal, may not be directly output to the motor driver 3000. Therefore, the 2-2-th operation signals (i.e., 2-2-th operation ongoing signal and 2-2-th operation stop signal) may be referred to as 2-2-th operation sub-signals (2-2-th operation ongoing sub-signal and 2-2-th operation stop sub-signal) to distinguish them from the operation signals (operation ongoing signal and operation stop signal) output to the motor driver 3000 described above.

The operation ongoing signal or operation stop signal is generated by comparing two independently sensed motor values for one motor, as described above.

It is assumed that the 1-1-th operation ongoing signal, 1-2-th operation ongoing signal, 2-1-th operation ongoing signal, and 2-2-th operation ongoing signal are high-level signals, and the 1-1-th operation stop signal, 1-2-th operation stop signal, 2-1-th operation stop signal, and 2-2-th operation stop signal are low-level signals.

In this case, the 1-1-th operation signal, the 1-2-th operation signal, the 2-1-th operation signal, and the 2-2-th operation signal may be input to the AND gate 6130. The AND gate 6130 may be provided in the speed monitor 6100, or may be provided outside of the speed monitor 6100.

When the 1-1-th operation signal, the 1-2-th operation signal, the 2-1-th operation signal, and the 2-2-th operation signal are all operation ongoing signals, the AND gate 6130 will output an operation ongoing signal (i.e., a high-level signal). When at least one of the 1-1-th operation signal, the 1-2-th operation signal, the 2-1-th operation signal, and the 2-2-th operation signal is an operation stop signal, the AND gate 6130 will output an operation stop signal (i.e., a low-level signal). The output signal of the AND gate 6130 is provided to the motor driver 3000.

When the motor driver 3000 receives the operation ongoing signal, it may cause the first motor 4100-1 and the second motor 4100-2 to continue driving. However, when the motor driver 3000 receives the operation stop signal, it may stop driving the first motor 4100-1 and the second motor 4100-2 or cut off the power supplied to the first motor 4100-1 and the second motor 4100-2. Thus, the robot 100 may stop traveling.

It has been described above that two or more operation signals are input to the AND gate. However, when the operation ongoing signal is a low-level signal and the operation stop signal is a high-level signal, an OR gate may be used instead of the AND gate. In other words, when at least one of the two or more operation signals is an operation stop signal, the OR gate may output the operation stop signal. When the two or more operation signals are all operation ongoing signals, the OR gate may output the operation ongoing signal.

Figure 13:
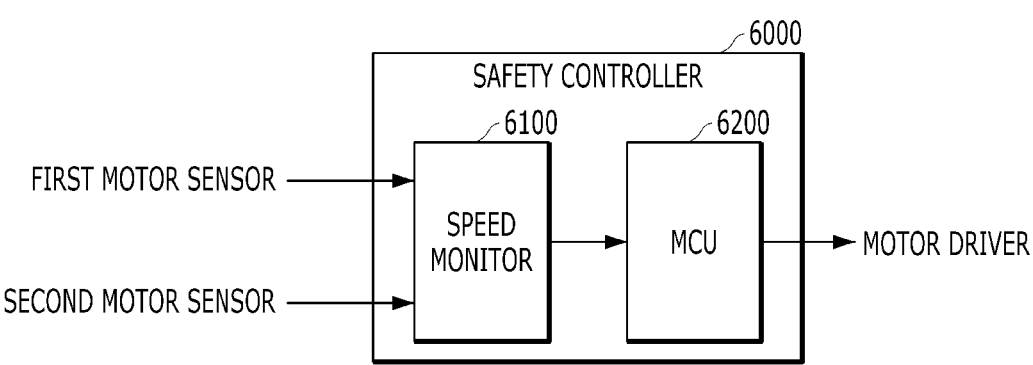
FIGS. 13 and 14 illustrate examples of the safety controller of FIG. 1.

It has been described above that the speed monitor 6100 includes an AND gate or an OR gate. However, the AND gate or OR gate may not necessarily be included in the speed monitor 6100. This will be further described with reference to FIG. 13. FIG. 13 illustrates an example of the safety controller of FIG. 1.

As shown in FIG. 13, the safety controller 6000 may include a speed monitor 6100 and a processor 6200. The safety controller 6000 may be implemented as a single board and mounted on the robot 100.

The speed monitor 6100 may be the same as the speed monitors described above with reference to FIGS. 9, 10, and 12, except that it does not include an AND gate or an OR gate.

The processor 6200 may be configured as a microcontroller unit.

The speed monitor 6100 may receive a first motor sensed value and a second motor sensed value from the first motor sensor 4310 and the second motor sensor 4320 described above, and may generate a first operation signal and a second operation signal based on the received sensed values.

Then, the speed monitor 6100 may provide the first motor sensed value (or first rotational speed), the second motor sensed value (or second rotational speed), the first operation signal, and the second operation signal to the processor 6200.

Based on the first motor sensed value (or first rotational speed) and the second motor sensed value (or second rotational speed), the processor 6200 may again verify the correctness of the first operation signal and/or the second operation signal. For example, even if the first operation signal and the second operation signal are the first operation ongoing signal and the second operation ongoing signal, the processor 6200 may once again verify that they are the first operation ongoing signal and the second operation ongoing signal based on whether the difference between the first motor sensed value (or first rotational speed) and the second motor sensed value (or second rotational speed) is within a threshold. When the verification shows that the difference between the first motor sensed value (or first rotational speed) and the second motor sensed value (or second rotational speed) is beyond the threshold, an operation stop signal may be output despite the first operation ongoing signal and the second operation ongoing signal received from the speed monitor 6100.

Further, the processor 6200 may further consider a target speed (or target travel speed) of the traveling robot 100 to verify the correctness of the operation signals.

As used herein, target speed may refer to a currently required (or intended) travel speed of the traveling robot 100. The target speed may be received by the processor 6200 from the path guider 1000.

It has been described above that an operation ongoing signal is output when the difference between the first motor sensed value and the second motor sensed value is within a threshold, and an operation stop signal is output when the difference is beyond the threshold.

However, even when the difference between the first motor sensed value and the second motor sensed value is within the threshold, the processor 6200 may output an operation stop signal if the travel speed of the robot 1000 according to at least one of the first motor sensed value and the second motor sensed value is beyond the target speed and a predetermined range, even if both the first operation sub-signal and the second operation sub-signal correspond to operation ongoing signals. This is because even if the difference between the first motor sensed value and the second motor sensed value is within the threshold, both sensed values may be viewed as having an error or the motor 4100 or other components may be viewed as having an error. When the difference between the first motor sensed value and the second motor sensed value is within the threshold (i.e., both the first operation sub-signal and the second operation sub-signal correspond to the operation ongoing signals), the processor 6200 may output the operation ongoing signal if the travel speed of the robot 1000 according to the first motor sensed value and the second motor sensed value is within the target speed and the predetermined range.

The operation signal output by the processor 6200 may be provided to the motor driver 3000. The motor driver 3000 may operate in response to the operation signal as described above.

It has been described above that the speed monitor 6100 of FIG. 13 includes an AND gate or an OR gate. The speed monitor 6100 may also include an AND gate or an OR gate. In this case, instead of the first operation signal and the second operation signal, the output signal of the AND gate or OR gate may be provided to the processor 6200, and the processor 6200 may verify the output signal based on the target speed as well as the first motor sensed value and the second motor sensed value.

Figure 14:
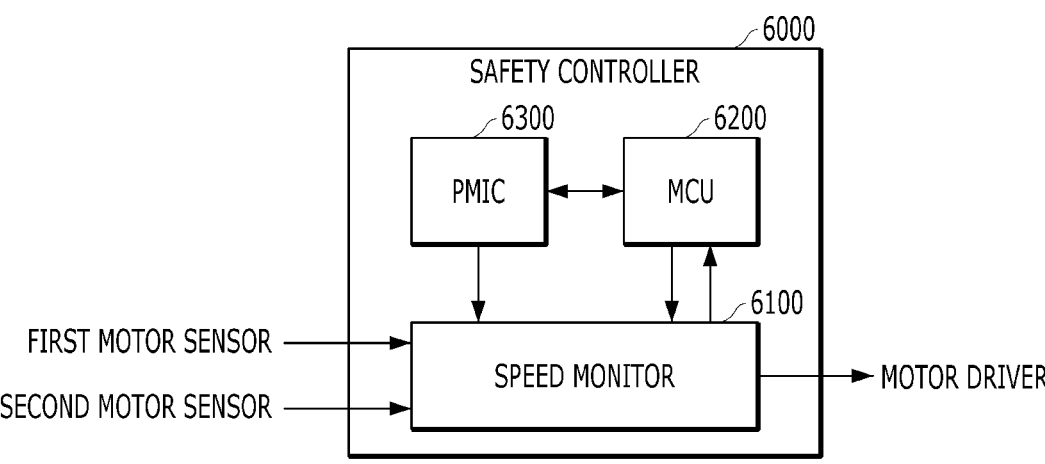

Hereinafter, an example variation of the safety controller of FIG. 13 will be described with reference to FIG. 14. FIG. 14 illustrates an example of the safety controller of FIG. 1.

As shown in FIG. 14, the safety controller may include a power manager 6300 as well as the speed monitor 6100 and processor 6200. The safety controller 6000 may be implemented as a single board and mounted on the robot 100.

An operation signal output from the speed monitor 6100 may be provided to the motor driver 3000.

The data or signals provided to the processor 6200 from the speed monitor 6100 may be the same as described with reference to FIG. 13.

The processor 6200 may once again verify the correctness of the operation signal based on the first motor sensed value, the second motor sensed value, and the target speed, as described with reference to FIG. 13.

When it is determined that the operation signal is correct based on the verification, the processor 6200 may output a control signal to the speed monitor 6100 to cause the speed monitor 6100 to continue to output the operation signal (operation ongoing signal or operation stop signal) to the motor driver 3000.

On the other hand, when it is determined that the operation signal is incorrect based on the verification and the operation signal is an operation ongoing signal, the processor 6200 may output a control signal to the speed monitor 6100 to cause the speed monitor 6100 to output an operation stop signal to the motor driver 3000.

When it is determined that the operation signal is incorrect based on the verification and the operation signal is an operation stop signal, the processor 6200 may output a control signal to the speed monitor 6100 to cause the speed monitor 6100 to output an operation stop signal to the motor driver 3000, or may output a control signal to the speed monitor 6100 to cause the speed monitor 6100 to output an operation ongoing signal to the motor driver 3000. In this case, whether to output the operation ongoing signal or the operation stop signal may be determined by a preset.

The power manager 6300 may manage the power usage of the processor 6200 and monitor the power usage of the processor 6200 for abnormalities.

When it is determined from the monitoring that there is an abnormality in the power usage of the processor 6200, the power manager may output a control signal to the speed monitor 6100 to cause the speed monitor 6100 to output an operation stop signal to the motor driver 3000.

Even when the speed monitor 6100 receives the control signal of the operation ongoing signal from the processor, the speed monitor 6100 may output the operation stop signal to the motor driver 3000 according to the control signal for the operation stop signal received from the power manager.

When the safety controller described above and peripheral components thereof (e.g., at least one of the drive unit 2000 and the motor driver 3000) are configured as an on-board system and receive motor sensed values from the motor sensors 4310 and 4320 via a connector of the on-board system, the connection harness may be simplified.

Figure 2:
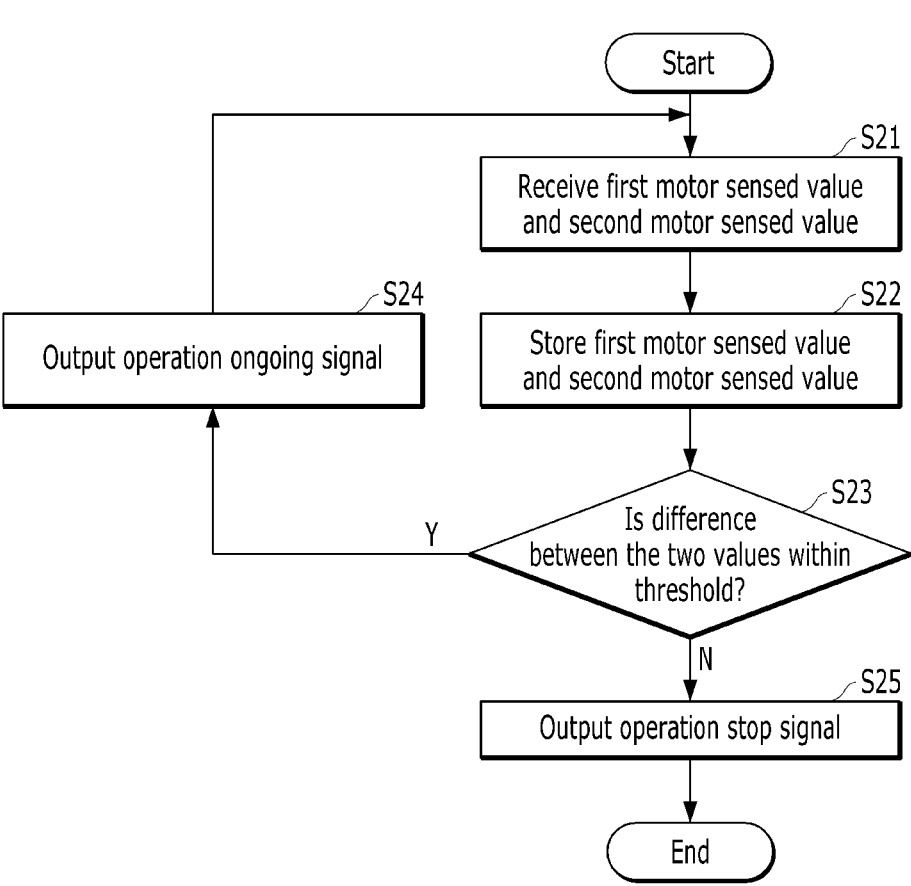
FIG. 2 is a flowchart of a process of operation of the safety controller and peripheral components of FIG. 1.

The safety controller 6000 may continue to execute the process of FIG. 2 while the robot 100 is traveling. In addition, the safety controller 6000 may perform the following travel safety-related operation process in parallel with the operation process of FIG. 2. This will be described with further reference to FIG. 15. FIG. 15 is a flowchart illustrating another process of operation of the safety controller of FIG. 2 and peripheral components thereof.

For traveling of the robot 100, the motor driver 3000 may convert an output signal of the drive unit 2000 into an operation signal to start operating the motor and provide the operation signal to the actuator assembly 4000, that is, the motor 4100 [S151].

Then, the safety controller 5000 may perform the operation process of FIG. 2 described above.

In addition, the safety controller 5000 may communicate with the traveling safety sensor 5000 separately from the operation process of FIG. 2 [S152]. That is, the safety controller 5000 may receive a traveling safety sensing signal from the traveling safety sensor 5000.

Based on the traveling safety sensing signal, the safety controller 5000 may determine whether there is an obstacle within a safety zone [S153]. The safety zone may refer to an area around the robot 100 that should be free of obstacles for safe traveling of the robot 100. The size of the safety zone may be variable in proportion to the traveling speed or target speed of the robot 100.

When it is sensed that there are no obstacles within the safety zone as a result of the determination, the safety controller 5000 may continue to communicate with the safety sensor and allow the robot to continue traveling.

However, When it is sensed that is an obstacle within the safety zone as a result of the determination, the safety controller 5000 may output a control signal requesting the drive unit 2000 to slow down to a safe speed [S154].

Then, the safety controller 5000 may measure the traveling speed of the robot 1000 based on the motor sensed values described above [S155].

Then, the safety controller 5000 may determine whether the traveling speed of the robot 1000 has been reduced to a safe speed within a predetermined time [S156]. The predetermined time may be varied to be proportional to the difference between the traveling speed and the safe speed.

When, as a result of the determination, the traveling speed has been reduced to the safe speed, the safety controller 5000 may continue to communicate with the safety sensor and allow the robot to continue traveling.

However, When, as a result of the determination, the traveling speed has not been reduced to the safe speed, the safety controller 5000 may output an operation stop signal to the motor driver 3000. That is, when the traveling speed has not been reduced to the safe speed, the safety controller 5000 may output an operation stop signal to the motor driver 3000 even if the difference between the first motor sensed value and the second motor sensed value of the motor 4100 is within a threshold. When the motor driver 3000 receives the operation stop signal, it may stop driving the motor 4100 or cut off the power supplied to the motor 4100 [S157]. Thus, the robot 100 may stop traveling.

Figure 16:
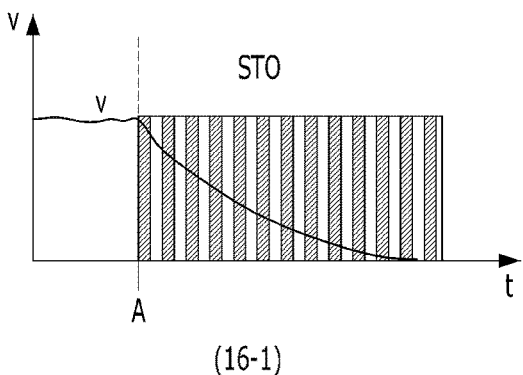
FIG. 16 is a graph depicting an operation stop signal input to a motor driver to stop traveling of a robot according to one aspect of the present disclosure.
Figure 16:
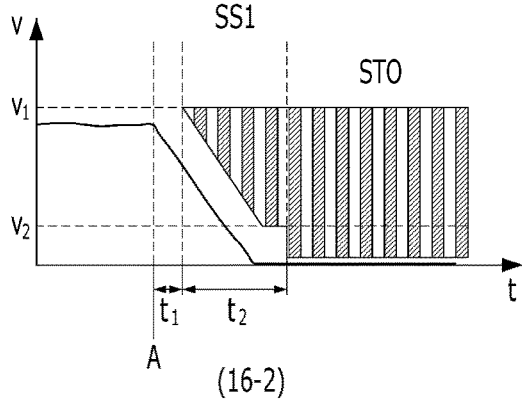
Figure 16:
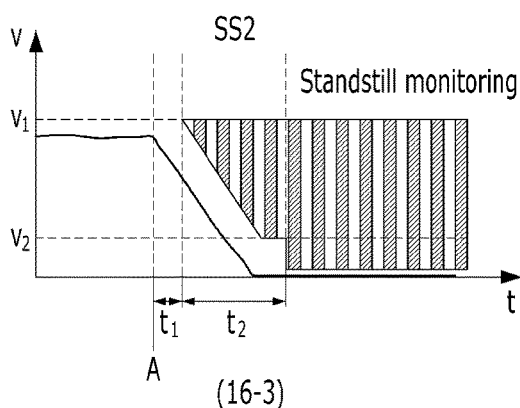

Hereinafter, an operation stop signal input to the motor driver 3000 to stop traveling of the robot 100 will be described with reference to FIG. 16. FIG. 16 is a graph depicting an operation stop signal input to the motor driver 3000 to stop traveling of the robot according to one aspect of the present disclosure. Here, V represents a traveling speed of the robot.

Graph 16-1 in FIG. 16 illustrates that the operation stop signal consists of an STO signal only. Specifically, an operation stop signal may be input to the motor driver 3000 when an abnormality of the motor 4100, motor sensors 4310, 4320, or other components is detected at a first time A while the robot 100 is traveling at speed V. When the operation stop signal is an STO signal, the motor driver 3000 may cut off power to the motor 4100. That is, the motor driver 3000 may prevent the motor 4100 from generating torque. Then, the robot 100 may move and stop based on inertia as the speed decreases.

Graph 16-2 in FIG. 16 illustrates that the operation stop signal consists of an SS signal and an STO signal. That is, when an abnormality of the motor 4100, motor sensors 4310, 4320, or other components is detected at the first time A while the robot 100 is traveling at speed V, an SS signal may be input to the motor driver 3000 after a first time period t1. The SS signal may be input during a second time period t2 until the robot decelerates to a target stop speed (e.g., 0 m/s). After the second time period t2, the STO signal may be input to the motor driver 3000. The motor driver 3000 may then cut off the power supplied to the motor 4100. That is, the motor driver 3000 may prevent the motor 4100 from generating torque. Then, the robot 100 may stay stationary.

However, when the power to the motor 4100 is cut off while the robot 100 is traveling on a ramp, the torque of the motor 4100 may not be generated and the robot 100 may travel at a higher speed down the ramp. This may lead to a greater accident.

Accordingly, as shown in graph 16-3 in FIG. 16, the operation stop signal may consist of an SS signal and a standstill signal. That is, when an abnormality of the motor 4100, motor sensors 4310, 4320, or other components is detected at the first time A while the robot 100 is traveling at speed V on the ramp, an SS signal may be input to the motor driver 3000 after the first time period t1. The SS signal may be input during the second time period t2 until the robot decelerates to a target stop speed (e.g., 0 m/s). After the second time period t2, the standstill signal may continue to be input to the motor driver 3000 to ensure that the motor continues to generate stopping torque. The standstill signal may be included in the operation stop signal instead of the STO signal only during traveling of the robot 100 on the ramp.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

What is claimed is:

1. A motor safety control method for a robot, comprising:
receiving a first motor value from a first sensor of a motor;
receiving a second motor value from a second sensor of the motor, wherein a resolution of the first sensor is higher than a resolution of the second sensor;
inputting the first motor value and the second motor value respectively to a first speed sub-monitor of a speed monitor of a safety controller configured to compute a first rotational speed of the motor based on the first motor value and a second speed sub-monitor of a speed monitor of the safety controller configured to compute a second rotational speed of the motor based on the second motor value;
comparing a threshold with a first difference between the first rotational speed and the second rotational speed at the first speed sub-monitor and comparing the threshold with a second difference between the first rotational speed and the second rotational speed at the second speed sub-monitor; and transmitting an operation signal to a motor driver for the motor to continue or stop operation of the motor based on comparisons at the first speed sub-monitor and the second speed sub-monitor.

2. The method of claim 1, wherein:

the first sensor comprises a motor encoder; and the second sensor comprises at least one Hall sensor disposed inside the motor.

3. The method of claim 1 wherein the operation signal is one of:

an operation ongoing signal for operation of the motor to continue; or an operation stop signal for operation of the motor to stop.

4. The method of claim 3, wherein the operation ongoing signal is transmitted to the motor driver based on the first difference and the second difference both being within the threshold, and the operation stop signal is transmitted to the motor driver based on one of the first difference or the second difference being outside of the threshold.

5. The method of claim 1, wherein the first motor value is input to the second speed sub-monitor via the first speed sub-monitor, and wherein the second motor value is input to the first speed sub-monitor via the second speed sub-monitor.

6. The method of claim 1, further comprising:

inputting two motor values of another motor to the first speed sub-monitor and the second speed sub-monitor, respectively.

7. The method of claim 1, wherein the first speed sub-monitor generates a first operation sub-signal based on the first difference, wherein the second speed sub-monitor generates a second operation sub-signal based on the second difference, and wherein the safety controller generates the operation signal based on the first operation sub-signal and the second operation sub-signal and outputs the operation signal to the motor driver.

8. The method of claim 7, further comprising:

transmitting the first motor value, the second motor value, the first operation sub-signal, and the second operation sub-signal to a processor of the safety controller.

9. The method of claim 8, further comprising:

receiving a target travel speed of the robot from a path guider; and verifying, by the processor, correctness of the first operation sub-signal and the second operation sub-signal by comparing the target travel speed with the first motor value and the second motor value.

10. The method of claim 9, further comprising:

outputting, by the processor, the operation stop signal to the motor driver based on a difference between the target travel speed and a travel speed of the robot according to at least one of the first motor value or the second motor value being out of a predetermined range, even when the first operation sub-signal and the second operation sub-signal correspond to operation ongoing signals.

11. The method of claim 9, further comprising:

transmitting, by the processor, a first control signal to the speed monitor for causing the speed monitor to output the operation stop signal to the motor driver based on the difference between the target travel speed and the travel speed of the robot according to at least one of the first motor value or the second motor value being out of a predetermined range.

12. The method of claim 11, further comprising:

monitoring, by a power manager, power usage of the processor for abnormalities; and transmitting, by the power manager, a second control signal to the speed monitor for causing the speed monitor to output the operation stop signal to the motor driver based on abnormal power usage of the processor.

13. The method of claim 1, further comprising:

determining, from a traveling safety sensing signal received from a traveling safety sensor, whether there is an obstacle present in a safety zone;

requesting a drive unit to decelerate to a safe speed based on determining that the obstacle is present; and outputting the operation stop signal to the motor driver based on the motor driver not having decelerated to the safety speed within a predetermined time.

14. The method of claim 13, wherein the operation stop signal comprises:

a safety stop (SS) signal for decelerating the robot to a target stop speed in response to detection of an abnormality of at least one of the motor, the first sensor, or the second sensor; and a safe torque off (STO) signal for blocking generation of torque by the motor after the robot is decelerated to the target stop speed.

15. A robot comprising:

a motor;

a first sensor configured to sense a first motor value for the motor;

a second sensor configured to sense a second motor value for the motor, wherein a resolution of the first sensor is higher than a resolution of the second sensor;

a motor driver configured to provide a drive signal to the motor;

a safety controller comprising a first speed sub-monitor and a second speed sub-monitor and configured to:

receive the first motor value and the second motor value respectively at the first speed sub-monitor configured to compute a first rotational speed of the motor based on the first motor value and the second speed sub-monitor configured to compute a second rotational speed of the motor based on the second motor value;

compare a threshold with a first difference between the first rotational speed and the second rotational speed at the first speed sub-monitor and comparing the threshold with a second difference between the first rotational speed and the second rotational speed at the second speed sub-monitor; and provide an operation signal to the motor driver to continue or stop operation of the motor based on the comparisons at the first speed sub-monitor and the second speed sub-monitor.

16. The robot of claim 15, wherein:

the first sensor comprises a motor encoder; and the second sensor comprises at least one Hall sensor disposed inside the motor.

17. The robot of claim 15, wherein the operation signal is one of:

an operation ongoing signal for operation of the motor to continue; or an operation stop signal for operation of the motor to stop.

18. The robot of claim 17, wherein, the operation ongoing signal is transmitted to the motor driver based on the first difference and the second difference both being within the threshold, the operation stop signal is transmitted to the motor driver based on one of the first difference or the second difference being outside of the threshold.

19. The robot of claim 15, wherein the safety controller comprises:

a speed monitor configured to generate a first operation sub-signal and a second operation sub-signal based on the first motor value and the second motor value;

a processor configured to verify correctness of the first operation sub-signal and the second operation sub-signal; and a power manager configured to monitor power usage of the processor for abnormalities, wherein the safety controller is implemented as a single board and mounted on the robot.

* * * * *